US008041230B2

(12) United States Patent
Umnov et al.

(10) Patent No.: US 8,041,230 B2
(45) Date of Patent: Oct. 18, 2011

(54) SYSTEM AND METHOD FOR OPTOELECTRICAL COMMUNICATION

(75) Inventors: Alexander Umnov, Sachse, TX (US); Dung Q. Tran, Grand Prairie, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/333,424

(22) Filed: Dec. 12, 2008

(65) Prior Publication Data
US 2010/0150569 A1    Jun. 17, 2010

(51) Int. Cl.
*H04B 10/00* (2006.01)

(52) U.S. Cl. .................. 398/164; 398/139; 398/141

(58) Field of Classification Search .................. 398/135, 398/139, 141, 164
See application file for complete search history.

(56) References Cited

U.S. PATENT DOCUMENTS

| | | | | |
|---|---|---|---|---|
| 5,448,661 A * | 9/1995 | Takai et al. | ...... | 385/24 |
| 5,452,118 A * | 9/1995 | Maruska | ...... | 398/204 |
| 5,500,523 A * | 3/1996 | Hamanaka | ...... | 250/216 |
| 5,636,047 A * | 6/1997 | Lagoutte et al. | ...... | 398/164 |
| 5,832,147 A * | 11/1998 | Yeh et al. | ...... | 385/14 |
| 5,960,135 A * | 9/1999 | Ozawa | ...... | 385/24 |
| 5,999,295 A * | 12/1999 | Vowell et al. | ...... | 398/164 |
| 6,215,585 B1 * | 4/2001 | Yoshimura et al. | ...... | 359/344 |
| 6,393,184 B1 * | 5/2002 | Day et al. | ...... | 385/49 |
| 6,400,481 B1 * | 6/2002 | Bradford et al. | ...... | 398/135 |
| 6,616,344 B1 * | 9/2003 | Van Deventer | ...... | 385/88 |
| 6,634,802 B2 * | 10/2003 | Brezina et al. | ...... | 385/88 |
| 6,634,812 B2 * | 10/2003 | Ozeki et al. | ...... | 398/164 |
| 6,792,213 B1 * | 9/2004 | Okada et al. | ...... | 398/142 |
| 6,855,572 B2 * | 2/2005 | Jeung et al. | ...... | 438/106 |
| 6,907,198 B2 * | 6/2005 | Nishimura | ...... | 398/79 |
| 7,046,871 B2 * | 5/2006 | Shen | ...... | 385/14 |
| 7,092,639 B2 * | 8/2006 | Schultz et al. | ...... | 398/163 |
| 7,110,679 B2 * | 9/2006 | Byers et al. | ...... | 398/164 |
| 7,200,334 B2 * | 4/2007 | Gayrard et al. | ...... | 398/118 |
| 7,211,816 B2 * | 5/2007 | Bozso et al. | ...... | 250/551 |
| 7,245,796 B2 * | 7/2007 | Ouchi | ...... | 385/14 |
| 7,264,405 B2 | 9/2007 | Ikeuchi | ...... | 385/88 |

(Continued)

OTHER PUBLICATIONS

Pepeljugoski, Petar, et al., Invited Paper, "*Comparison of Bandwidth Limits for On-Card Electrical and Optical Interconnects for 100 Gb/s and Beyond*", Optoelectronic Integrated Circuits X, Proc. of SPIE, vol. 6897, pp. 689701-1-689701-7, 2008.

(Continued)

*Primary Examiner* — Agustin Bello
(74) *Attorney, Agent, or Firm* — Baker Botts L.L.P.

(57) ABSTRACT

A method for upgrading an optoelectrical system includes securing a transmitter to a line card, wherein the line card comprises an optoelectrical connector. It also includes coupling the transmitter to the connector, wherein the connector comprises an embedded fiber configured to be coupled to the transmitter. In addition, the method includes inserting a pluggable form factor module comprising a receiver, an input port, and an output port into a cage secured to the line card. Further, the method includes coupling the pluggable form factor module to the connector such that an optical signal transmitted by the transmitter propagates in an optical line of sight between the embedded fiber of the connector and the output port. The connector comprises electrical contacts that are configured to be coupled to the module such that the receiver can convert optical signals received at the input port into electrical signals and transmit the electrical signals to the line card via the connector.

20 Claims, 5 Drawing Sheets

U.S. PATENT DOCUMENTS

| | | | |
|---|---|---|---|
| 7,275,937 B2 | 10/2007 | Ellison | 439/67 |
| 7,308,205 B2 * | 12/2007 | Ozeki et al. | 398/164 |
| 7,373,044 B2 * | 5/2008 | Sekiya et al. | 385/36 |
| 7,386,200 B2 * | 6/2008 | Uchida | 385/17 |
| 7,489,840 B2 * | 2/2009 | Sekiya et al. | 385/36 |
| 7,495,848 B2 * | 2/2009 | Hall et al. | 359/819 |
| 7,537,394 B2 * | 5/2009 | Rolston et al. | 385/89 |
| 7,689,129 B2 * | 3/2010 | Karashima et al. | 398/164 |
| 7,941,056 B2 * | 5/2011 | Baker et al. | 398/164 |
| 2002/0097962 A1 * | 7/2002 | Yoshimura et al. | 385/50 |
| 2002/0109074 A1 * | 8/2002 | Uchida | 250/214.1 |
| 2003/0152338 A1 * | 8/2003 | Kuhara et al. | 385/89 |
| 2003/0152391 A1 * | 8/2003 | Kuhara et al. | 398/164 |
| 2004/0076436 A1 * | 4/2004 | Bergmann et al. | 398/82 |
| 2005/0276612 A1 * | 12/2005 | Wawro et al. | 398/164 |
| 2010/0150569 A1 * | 6/2010 | Umnov et al. | 398/139 |
| 2010/0150570 A1 * | 6/2010 | Umnov et al. | 398/141 |

OTHER PUBLICATIONS

Patent Application entitled, "System and Method for Optoelectrical Communication", 20 pages specification, claims and abstract, 5 pages of drawings, inventors Alexander Umnov et al, Filed Dec. 12, 2008.

* cited by examiner

SYSTEM AND METHOD FOR OPTOELECTRICAL COMMUNICATION

TECHNICAL FIELD

This invention relates generally to optoelectrical systems and more particularly to a system and method for optoelectrical communication.

BACKGROUND

In optoelectrical communication systems, line cards are designed to contain the equipment necessary for the operation of the system; such equipment may include transmitters, receivers, or transceivers amongst other items. This equipment may also come in various form factors, such as Large Form Factor, Small Form Factor, Small Form Factor Pluggable (SFP) and 10 Gigabit Small Form Factor Pluggable (XFP). Various components of the system may be advanced such that they are configured into different form factors, but this may require new line cards. Configuring new line cards for different form factors is expensive thereby raising costs to take advantage of components in different form factors.

SUMMARY

A method for upgrading an optoelectrical system includes securing a transmitter to a line card, wherein the line card comprises an optoelectrical connector. It also includes coupling the transmitter to the connector, wherein the connector comprises an embedded fiber configured to be coupled to the transmitter. In addition, the method includes inserting a pluggable form factor module comprising a receiver, an input port, and an output port into a cage secured to the line card. Further, the method includes coupling the pluggable form factor module to the connector such that an optical signal transmitted by the transmitter propagates in an optical line of sight between the embedded fiber of the connector and the output port. The connector comprises electrical contacts that are configured to be coupled to the module such that the receiver can convert optical signals received at the input port into electrical signals and transmit the electrical signals to the line card via the connector.

The transmitter may be an Integratable Tunable Transmitter Assembly (ITTA). The receiver may be a Receiver Optical Sub-Assembly (ROSA). The connector may include a lens coupled to an end of the embedded fiber. The electrical contacts may be pins. The method may further include aligning the connector with the output port utilizing a sensor and an alignment tool.

A method for upgrading an optoelectrical system includes providing an optoelectrical system. The optoelectrical system includes a transmitter configured to transmit optical signals. The system also includes a pluggable form factor module. The pluggable form factor module includes an input port, an output port, and a receiver configured to convert optical signals received at the input port into electrical signals. The system further includes an optoelectrical connector coupled to the module and the transmitter. The connector includes an embedded fiber coupled to the transmitter and configured to transmit the optical signals from the transmitter to the output port of the module. The connector also includes electrical contacts configured to receive the electrical signals from the receiver. In addition, the system includes a cage configured to house the module and the connector while the transmitter is positioned outside the cage. The method for upgrading an optoelectrical system further includes decoupling the transmitter from the connector. It also includes decoupling the module from the connector. In addition, the method includes coupling a pluggable form factor transceiver to the connector. The pluggable form factor transceiver includes an input port, an output port, and a transmitter. The transmitter is operable to receive electrical signals from the electrical contacts, convert the electrical signals into optical signals, and communicate the optical signals from the output port. The pluggable form factor transceiver also includes a receiver operable to receive optical signals through the input port, convert the optical signals into electrical signals, and communicate the electrical signals to the electrical contacts.

Depending on the specific features implemented, particular embodiments may exhibit some, none, or all of the following technical advantages. The ability to upgrade components with particular form factors, such as a pluggable form factor transceiver, may be advantageous because it may allow for utilizing such components without the expense of replacing a line card. This may also be advantageous in that it may allow for faster upgrades. In addition, in particular embodiments, the amount of time during which the system may have to halt traffic for the upgrade may be reduced or avoided. Other technical advantages will be readily apparent to one skilled in the art from the following figures, description, and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
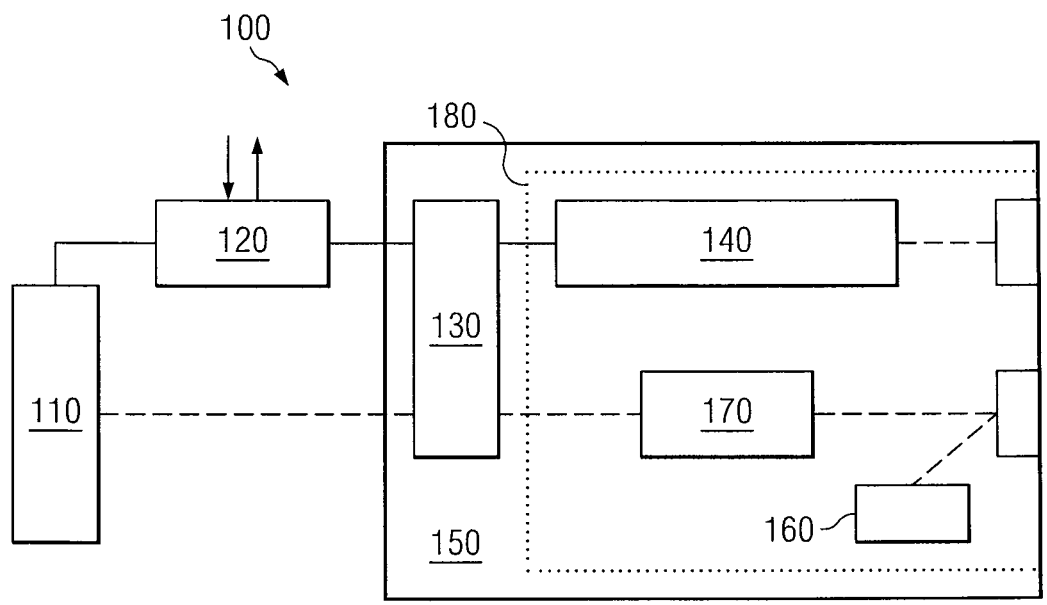
FIG. 1 is a block diagram of one embodiment of an optoelectrical system.

FIG. 1 is a block diagram of one embodiment of optoelectrical system 100. System 100 may, in some embodiments, be configured to transmit and receive optical signals (indicated by a dashed line) by using optical transmitter 110 and optical receiver 140. System 100 may be configured to operate on a line card. Circuit subsystem 120 may route electrical signals (indicated by a solid line) to components of system 100 as well as to other devices or systems which utilize system 100. Optoelectrical connector 130 may optically and/or electrically couple components of system 100 to facilitate optoelectrical communication. Alignment tool 170 and sensor 160 may be used to direct an optical beam which includes optical signals transmitted by system 100. Module 180 may be used to facilitate deployment of optical receiver 140, alignment tool 170, and sensor 160 by being inserted into cage 150.

In some embodiments, optical transmitter 110 may be coupled to optoelectrical connector 130. Optoelectrical connector 130 may be coupled to optical receiver 140. Both optoelectrical connector 130 and optical transmitter 110 may be coupled to circuit subsystem 120. In the illustrated embodiment, both optoelectrical connector 130 and optical receiver 140 are housed within cage 150. Sensor 160 and alignment tool 170 may be housed within cage 150.

Optical transmitter 110, in some embodiments, may be operable to receive electrical signals and generate optical signals in response. Optical transmitter 110 may be an Integratable Tunable Transmitter Assembly (ITTA). The ITTA may be configured to mount onto a line card. This may include drilling mounting holes onto the ITTA housing.

Optical receiver 140, in various embodiments, may be operable to receive optical signals and generate electrical signals in response. Optical receiver 140 may be implemented using a Receiver Optical Sub-Assembly (ROSA). Optical receiver 140 may, in particular embodiments, be configured to be housed within a cage (i.e., cage 150) capable of receiving modules in a pluggable form factor, such as Small Form Factor Pluggable (SFP), 10 Gigabit Small Form Factor Pluggable (XFP), or any other specification which specifies the design of pluggable devices.

Circuit subsystem 120, in some embodiments, may be configured to route electrical signals to and from components of system 100. It may route electrical signals to and from components not on the line card, such as a backplane. Circuit subsystem 120 may include switches (such as cross point switches) as well as other electrical circuits (such as ASICS) to route electrical signals. Circuit subsystem 120 may also include one or more Serializers/Deserializers (SerDes) to facilitate the processing of electrical signals.

Cage 150, in some embodiments, may be configured to house optical receiver 140 and optoelectrical connector 130. Cage 150 may also be configured to receive module 180 which may include components such as optical receiver 140. It may be in a pluggable form factor, such as Small Form Factor Pluggable (SFP), 10 Gigabit Small Form Factor Pluggable (XFP), or any other specification which specifies the design of pluggable devices. This may be advantageous, in many embodiments, in that it may be operable to receive an optical transceiver with a pluggable form factor, allowing system 100 to be upgradeable to this type of transceiver, as further described below. Cage 150 may be composed of metal, plastic, or a combination of metal and plastic.

Module 180, in some embodiments, may be in a pluggable form factor. It may include optical receiver 140 as well as alignment tool 170 and sensor 160. Module 180 may be configured to be received by cage 150. Module 180 may be operable to have optical signals transmitted out of it as well as optical signals passing into it through output and input ports, respectively; in some embodiments, these ports may be holes present on a surface of module 180. The output port may have a line of sight to optoelectrical connector 130 such that optical signals passing through optoelectrical connector may travel out of the output port.

Sensor 160 and alignment tool 170, in particular embodiments, are operable to aid in the alignment of an optical beam (carrying optical signals) traveling through module 180, as described further below. In some embodiments, the output port of module 180 comprises a lens which reflects a portion of the optical beam to sensor 160 when the optical beam is properly aligned. Sensor 160 may be a power monitor operable to measure the amount of the optical beam reflected from the output port of module 180. Alignment tool 170 may be utilized to adjust the optical beam such that it is further aligned with the output port of module 180. It may include at least one mechanized mirror operable to guide the optical beam. Alignment tool 170 may include birefringent crystals combined with a Faraday rotator in order to magnetically manipulate the optical beam. For example, one crystal may split the optical beam into two beams which may then be manipulated as an electromagnetic field is applied to the Faraday rotator. After the beams pass through the Faraday rotator, another birefringent crystal combines the redirected beams back into one optical beam.

In some embodiments, system 100 may be configured to communicate by sending and receiving optical signals. Optical transmitter 110 may be configured to generate optical signals in response to electrical signals received from circuit subsystem 120. The optical signals generated by optical transmitter 110 may be transmitted out of system 100 by passing through optoelectrical connector 130, as further described below. Optical receiver 140 may receive optical signals and, in response, transmit electrical signals through optoelectrical connector 130, as described further below. The electrical signals generated by optical receiver 140 may be received by circuit subsystem 120 via connector 130.

Figure 2:
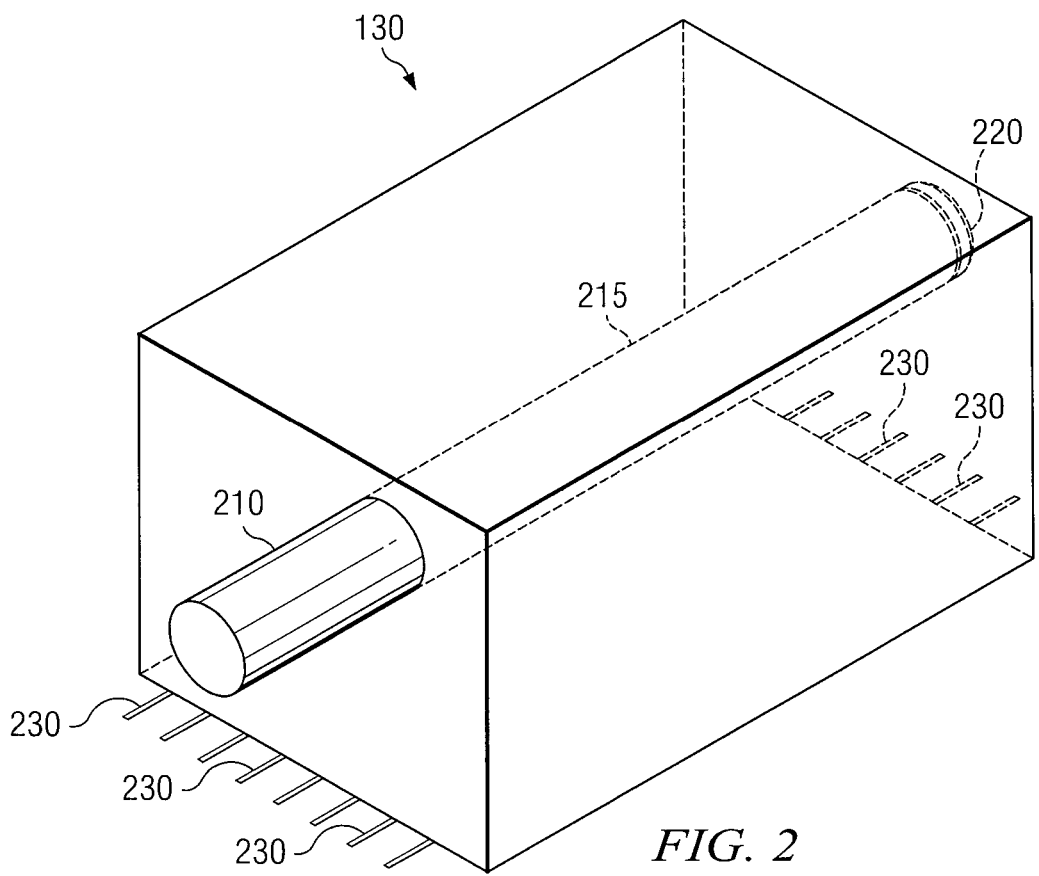
FIG. 2 illustrates one embodiment of an optoelectrical connector of FIG. 1.

FIG. 2 illustrates one embodiment of optoelectrical connector 130. Optoelectrical connector 130 may include optical fiber 210 coupled to lens 220 with a portion 215 of fiber 210 being embedded in connector 130. Embedded portion 215 may be formed using conventional molding techniques. In some embodiments, optoelectrical connector 130 includes electrical contacts 230.

Optical fiber 210 may be used to optically couple optoelectrical connector 130 and optical transmitter 110. The optical signals generated by optical transmitter 110 may travel through optoelectrical connector 130 by passing through optical fiber 210, including embedded portion 215, to lens 220. Lens 220 may, in certain embodiments, be configured to direct the path of the optical signals. For example, lens 220 may focus and/or collimate the light traveling in fiber 210.

In some embodiments, electrical contacts 230 may include pins which communicate electrical signals. Electrical contacts 230 may include 30 pins in a 2×15 configuration. Electrical contacts 230 may be configured to have different pin configurations that are suitable for various situations. For example, the pin configuration may be suitable for situations in which cage 150 is in a pluggable form factor, such as Small Form Factor Pluggable (SFP), 10 Gigabit Small Form Factor Pluggable (XFP), or any other specification which specifies the design of pluggable devices. Electrical contacts 230 may also be configured to communicate electrical signals to circuit subsystem 120 from optical receiver 140. For example, electrical contacts 230 may be coupled to a printed circuit board (PCB) that optical receiver 140 is also coupled to, thereby electrically coupling electrical contacts 230 and optical receiver 140. In particular embodiments, not all pins in electrical contacts 230 may be utilized in order to communicate signals from receiver 140 to circuit subsystem 120. Optoelectrical connector 130 may be coupled to a transceiver rather than to optical receiver 140. Pins of electrical contacts 230 not used when optoelectrical connector 130 is coupled to optical receiver 140 may be used when it is coupled to a transceiver by, for example, delivering electrical signals to the transceiver. Electrical contacts 230 may include wires, leads, etched paths, or other suitable structures for carrying electrical signals.

Figure 3:
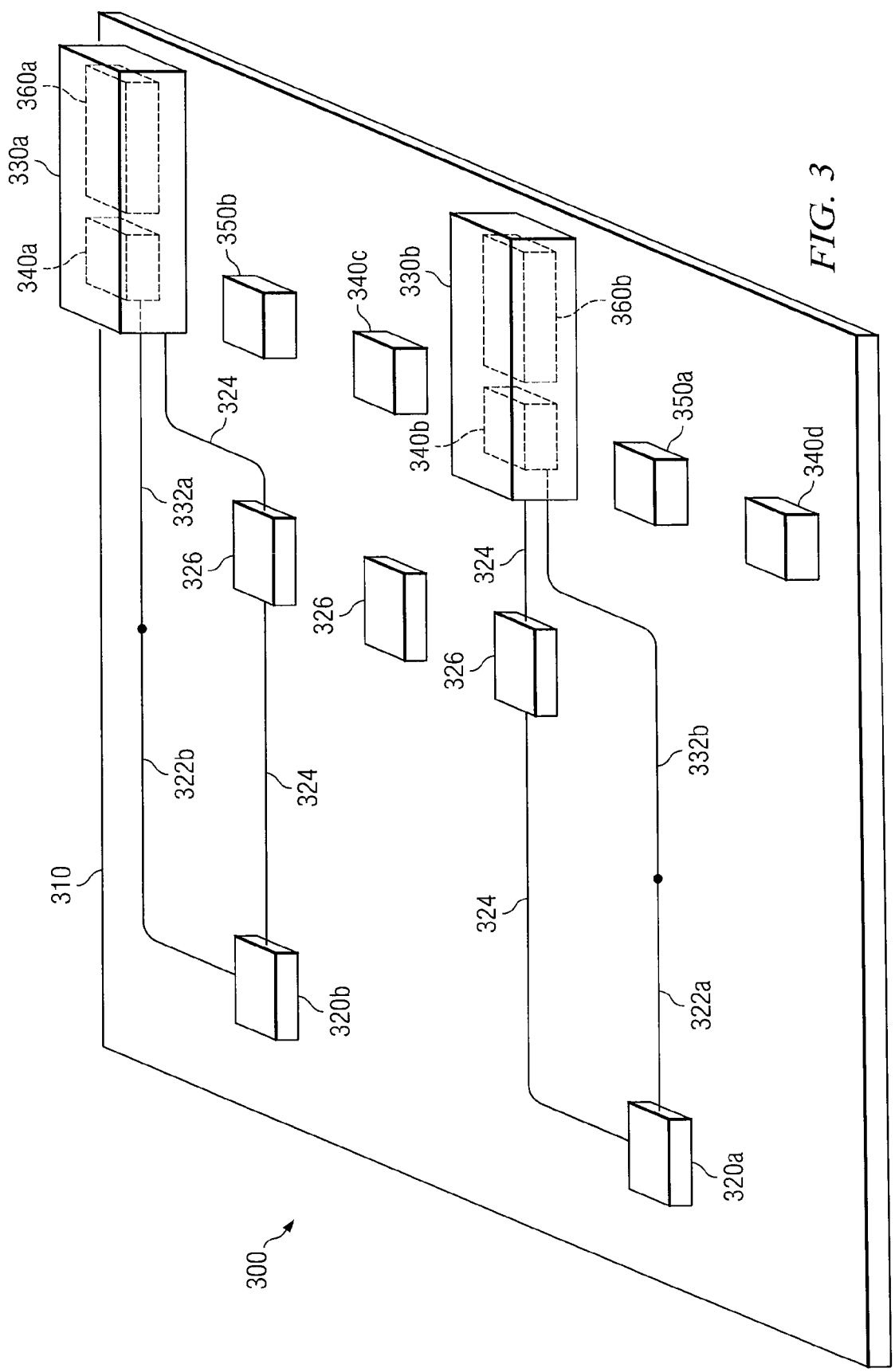
FIG. 3 illustrates a line card layout of one embodiment of an optoelectrical system.

FIG. 3 illustrates one embodiment of optoelectrical system 300. Optoelectrical system 300 may be configured to send and receive optical signals by utilizing optical transmitters 320 (which may be configured like optical transmitter 110) and modules 360 (which may be configured like module 180 and include an optical receiver like optical receiver 140). Connectors 340 and 350, as well as electrical paths 324 and circuit subsystems 326 may aid in routing electrical and optical signals to and from components on line card 310. Optical transmitters 320 may be coupled to connectors 340 via optical fibers 322 and 332. In some embodiments, optical fibers 322 and 332 may be one continuous fiber while in other embodiments they may be two or more coupled fibers. Cages 330 may house optoelectrical connectors 340a-b and modules 360. They may be configured like cage 150. As in the illustrated embodiment, optoelectrical connectors 340, optical transmitters 320, and electrical connectors 350 may be electrically coupled to other systems (not depicted) through electrical paths 324 and circuit subsystems 326.

Line card 310 may be, in various embodiments, a printed circuit board configured to serve as a support plane and electrical connector for various components. Line card 310 may contain etched electrical paths, jumpers, and other structures to aid in the transfer of electrical signals. In particular embodiments, line card 310 may also include electrical paths 324 and circuit subsystems 326 which may be configured to route electrical signals to various components coupled to line card 310. Electrical paths 324 and circuit subsystems 326 may include wires, leads, and etched paths. Further, circuit subsystems 326 may include switched (such as cross point switches) and other components to route electrical signals. It may also be configured as circuit subsystem 120 of FIG. 1. Line card 310 may also contain structures to facilitate securing equipment to line card 310, such as holes, pins, and/or configurations meant to allow equipment to snap into line card 310.

Optoelectrical and electrical connectors 340 and 350, in some embodiments, may be configured to be secured to line card 310 using adhesives. They may be secured using solder as well as, or in addition to, using a set of holes configured to receive pins. The holes may be on line card 310 while the pins may be on connectors 340 and 350 or the pins may be on line card 310 and the holes may be on connectors 340 and 350. Connectors 340 and 350 may also be configured to snap into line card 310. Optoelectrical connectors 340 may be configured like optoelectrical connector 180. In some embodiments, electrical connectors 350 may be configured like optoelectrical connector 180. Electrical connectors 350 may be configured to include electrical contacts, such as electrical contacts 230.

In certain embodiments, optoelectrical system 300 may operate by transmitting and receiving optical signals through modules 360 and transmitters 320. Optical transmitters 320 may transmit optical signals through optical fibers 322 and 332. These signals, in various embodiments, may then be transmitted out of modules 360 via optoelectrical connectors 340a-b. Optical transmitters 320 may generate optical signals in response to received electrical signals delivered by electrical paths 324 and circuit subsystems 326. Modules 360 may receive optical signals and transmit electrical signals in response to the received optical signals through electrical paths 324 and circuit subsystems 326 via optoelectrical connectors 340a-b. Line card 310 may be configured to receive additional equipment by having pre-mounted optoelectrical connectors 340c-d and electrical connectors 350 without associated cages and not coupled to transmitters or receivers, as explained below. Though not illustrated, line card 310 may also be configured with additional cages housing optoelectrical connectors 340c-d and electrical connectors 350.

Figure 4:
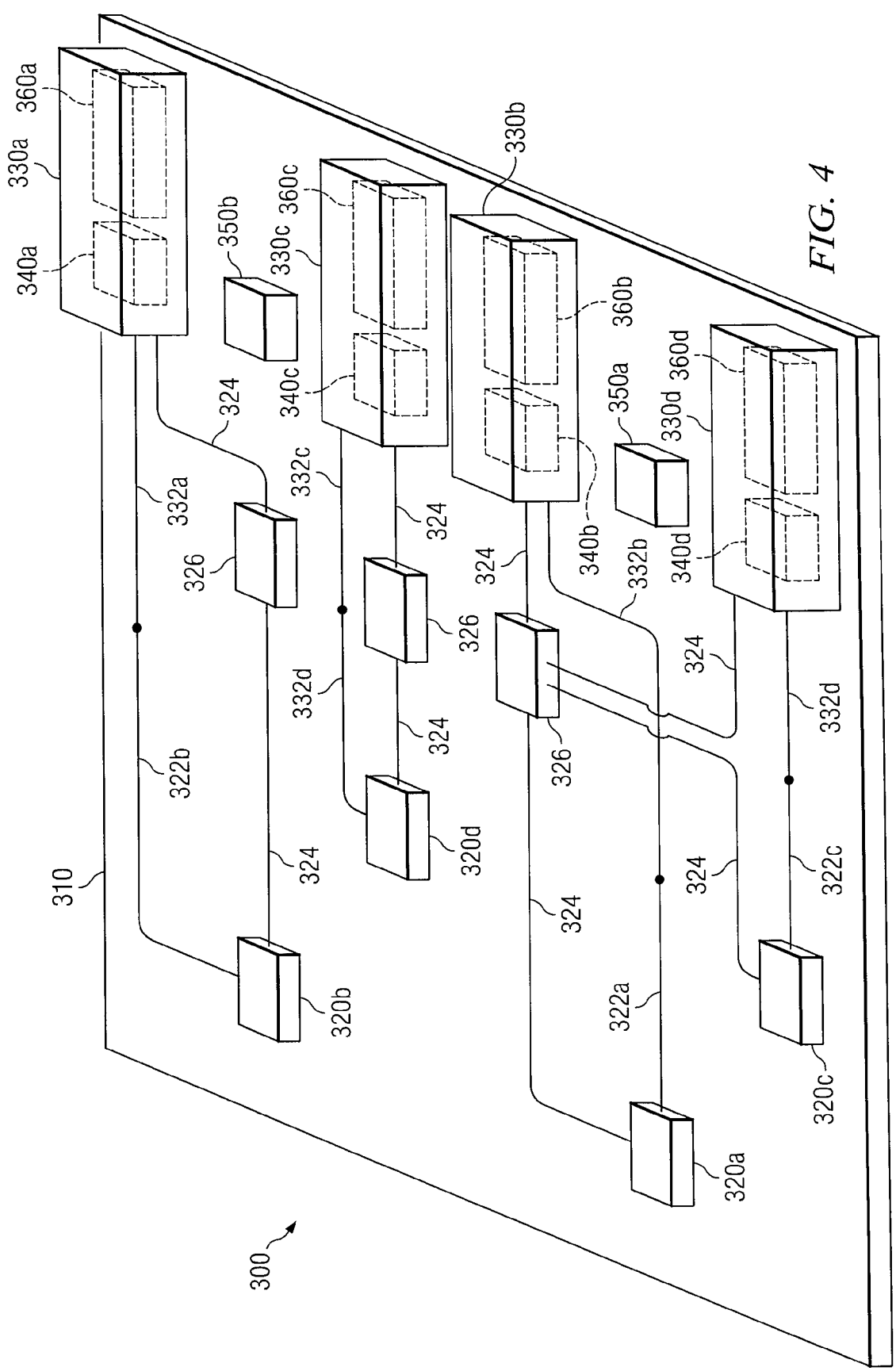
FIG. 4 illustrates one embodiment of the optoelectrical system of FIG. 3 with additional equipment.

FIG. 4 illustrates one embodiment of optoelectrical system 300 with additional equipment. Line card 310 may be configured as in FIG. 3 but with additional optical transmitters 320c-d as well as additional cages 330c-d and modules 360c-d. Further, line card 310 may be configured with additional optical fibers 322c-d and 332c-d as well as electrical paths 324 in order to facilitate the transmitting of optical signals by the additional transmitters 320c-d and the receiving of optical signals by the additional modules 360c-d. Hence, FIG. 4 illustrates an example of how optoelectrical system 300 may be configured with additional equipment in order to increase its capacity to send and receive optical signals. As in the illustrated example, line card 310 may be produced such that components used for additional capacity, such as connectors 340c-d, are already coupled to line card 310 though they might not be used immediately. In various embodiments, cages 360c-d may also be provided with line card 310 housing only connectors 340 or 350. Thus, for example, system 300 may be optionally upgraded to increase capacity (in one example, by increasing the number of wavelengths) while in the field; it may only be necessary to purchase components such as transmitters 320 and modules 360 to perform the upgrade.

Figure 5:
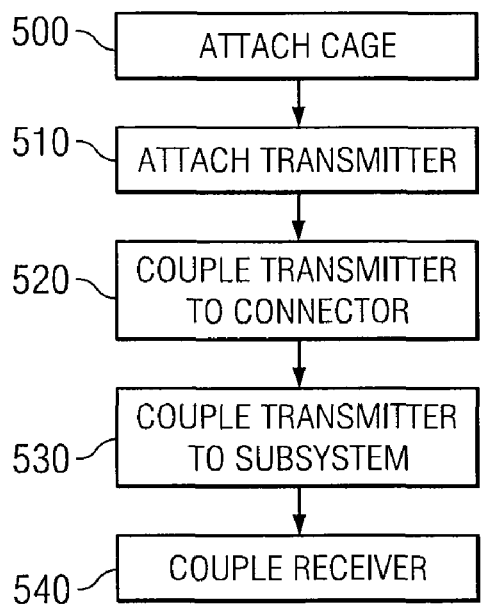
FIG. 5 illustrates another embodiment of the optoelectrical system of FIG. 3 with additional equipment.

FIG. 5 is a flowchart describing one embodiment of a method of expanding the traffic-handling capacity of an optoelectrical system. The optoelectrical system may be configured like optoelectrical system 300 of FIG. 3. After the steps of FIG. 5 are performed, the optoelectrical system may be configured as depicted in FIG. 4. The optoelectrical system may be deployed and operating prior to the expanding steps described below. In general, the steps illustrated in FIG. 5 may be combined, modified, or deleted where appropriate, and additional steps may also be added to the example operation. Furthermore, the described steps may be performed in any suitable order.

At step 500, a cage may be attached to the line card of the optoelectrical system. The line card may be configured to receive additional cages; an example of such a configuration is optoelectrical system 300 of FIG. 3. In some embodiments, the line card may be delivered with cages already attached but without modules used for sending and/or receiving optical signals. Delivering line cards with empty cages secured to the line card may be advantageous in that the line card may be configured to be expanded without having to move components or otherwise redesign the configuration on the line card which may be costly. The cage may be secured using screws, adhesives, or it may snap into the line card.

At step 510, an optical transmitter (such as optical transmitter 320) may be attached to the line card. It is not necessary that the optical transmitter be secured to the line card after the cage is secured to the line card; thus, step 510 may be performed prior to step 500. The optical transmitter may be secured to the line card using screws, adhesives, or it may be snapped into the line card. The line card may be configured to receive additional transmitters; an example a line card configured in such a manner is line card 310 of the embodiments illustrated in FIGS. 3 and 4.

At step 520, the optical transmitter may be optically coupled to an available optoelectrical connector, such as optoelectrical connector 340. It is not necessary that the optical transmitter be secured to the line card nor is it necessary that the cage be secured on the line card prior to optically coupling the transmitter to an optoelectrical connector; thus step 520 need not be performed after steps 500 or 510. In some embodiments, optoelectrical connectors may be provided on the line card when delivered to a customer though they may not be immediately utilized, such as optoelectrical connectors 340c-d of the embodiment illustrated in FIG. 3. Optical fibers may be used to couple the transmitter to the optoelectrical connector.

At step 530, the optical transmitter may be electrically coupled to a circuit subsystem, such as circuit subsystem 326.

This may occur during or before the transmitter is attached to the line card or before the transmitter is coupled to the optoelectrical connector; it may also occur before the cage is secured to the line card. Thus, step 530 does not have to proceed steps 500-520. For example, the optical transmitter may be coupled to the circuit subsystem utilizing a RF cables and connectors which may not require securing the transmitter to the line card. Coupling the transmitter to the circuit subsystem may also be accomplished through electrical paths, such as electrical paths 324. Further, contacts may be placed on the surface of the line card and configured to interface with the optical transmitter when the optical transmitter is secured to the line card. The optical transmitter may also be configured to be coupled through a PCB.

At step 540, an optical receiver may be coupled to the line card. This may be accomplished by inserting a module comprising the optical receiver, such as module 360, into the cage attached to secured to the line card in step 500. The optical receiver may also be electrically coupled to an optoelectrical connector housed by the cage. This may occur utilizing pins, etched paths, printed circuit boards, and/or leads. The module comprising the optical receiver may be secured to the cage and/or line card utilizing screws, adhesives, or it may be configured to snap into the cage and/or the line card.

Figure 6:
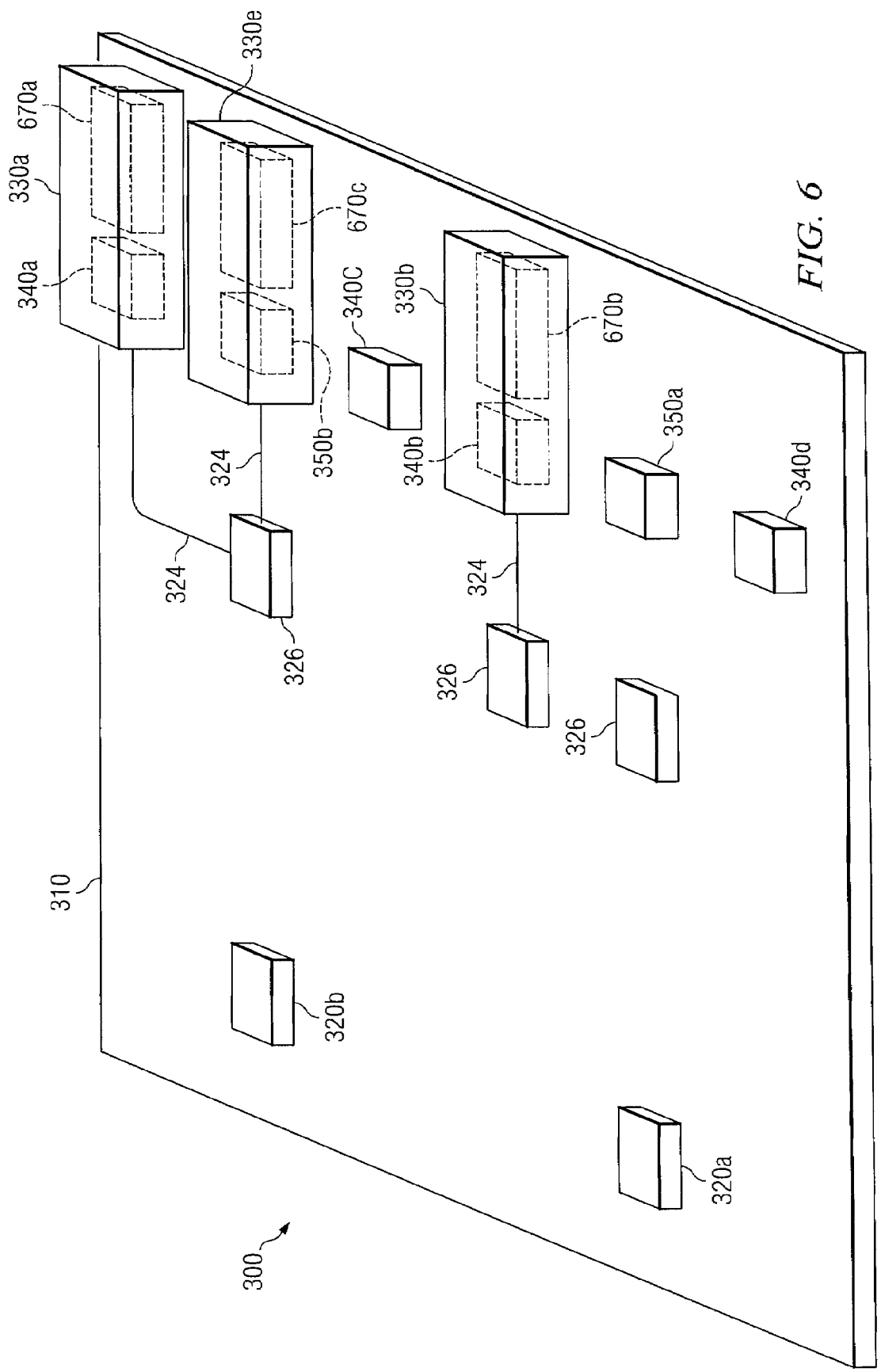
FIG. 6 is a flowchart describing one embodiment of a method of upgrading an optoelectrical system.

FIG. 6 illustrates another embodiment of optoelectrical system 300 with upgraded equipment. In the illustrated embodiment, modules 360 have been replaced with transceiver 670. Transceiver 670 may be able to both receive and send optical signals. Hence, transmitters 320 may be optically and/or electrically decoupled because transceivers 670 may be utilized to transmit optical signals. This may be advantageous because transceivers 670 may utilize less power than transmitters 320 and modules 360.

Optical transceivers 670 may be configured to be housed within cages 330. Optical transceivers 670a-b may be coupled to optoelectrical connectors 340a-b while optical transceiver 670c may be coupled to electronic connector 350b. Optical transceivers 670 may be configured to receive optical signals and, in response, transmit corresponding electrical signals to equipment coupled to circuit subsystems 326. For example, optical transceiver 670c may receive optical signals and, in response, transmit electrical signals to electrical connector 350b. Electrical connector 350b may then transmit electrical signals through electrical path 324 and circuit subsystems 326 to equipment (not illustrated) coupled to circuit subsystems 326. Such equipment may process the electrical signals and respond with other electrical signals sent to transceivers 670. Optical transceivers 670 may be configured to transmit optical signals in response to receiving electrical signals from the equipment coupled to circuit subsystems 326. For example, these electrical signals may be transmitted through electrical path 324 and electrical connector 350b which is coupled to optical transceiver 670c.

Optoelectrical connectors 340 may be used to transmit and receive electrical signals to and from optical transceivers 670. Each optoelectrical connector 340 may contain electrical contacts (which may be configured like electrical contacts 230) through which electrical signals travel but that may not be fully utilized when the optoelectrical connector 340 is coupled to an optical receiver; for example, all of the pins of the electrical contact may not be used when optoelectrical connector 340 is coupled to optical receiver 360. When optoelectrical connector 340 is coupled to optical transceiver 670, more of the pins of the electrical contacts of optoelectrical connector 340 may be utilized to transfer electrical signals to and from optical transceivers 670.

Thus, in various embodiments, system 300 may be upgraded to use optical transceivers instead of separate optical transmitters and receivers. Optical transmitters 320 may be decoupled from optoelectrical connectors 340. While the depicted embodiment indicates that optical transmitters 320 remain on line card 310, optical transmitters 320 may be removed from line card 310 in other embodiments. Further, modules 360 may be removed from cages 330 and replaced with optical transceivers 670. Optical transceivers 670 and cages 330 may have a pluggable form factor, which may be advantageous because it may reduce power consumption by a factor of two. Hence, in various embodiments, pluggable receivers (within modules 360) may be replaced with pluggable transceivers (for example, in an XFP or SFP form factor). For example, tunable-XFP-transceivers may be utilized to replace the pluggable receivers within modules 360.

Figure 7:
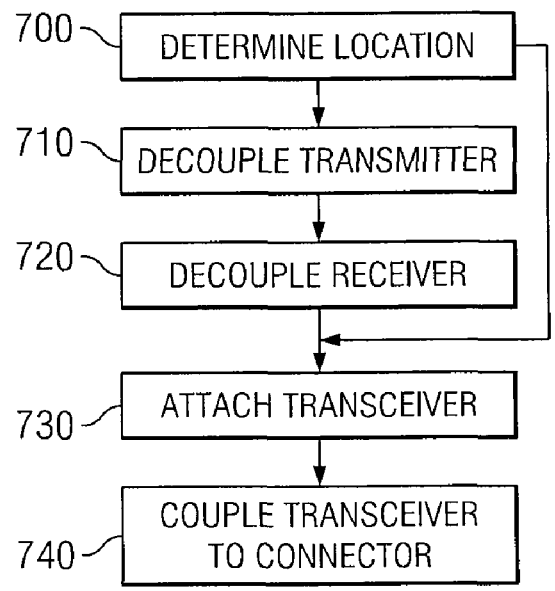
FIG. 7 is a flowchart illustrating one embodiment of a method of upgrading an optoelectrical system utilizing an optical transceiver.

FIG. 7 is a flowchart illustrating one embodiment of a method of upgrading an optoelectrical system utilizing an optical transceiver. After the steps of the flowchart are performed, a configuration similar to the embodiment depicted in FIG. 6 may be produced. In general, the steps illustrated in FIG. 7 may be combined, modified, or deleted where appropriate, and additional steps may also be added to the example operation. Furthermore, the described steps may be performed in any suitable order.

At step 700, a location on the line card may be determined for placement of the optical transceiver. In some instances, the optical transceiver will replace the functionality of an optical transmitter/receiver pair; in such instances, steps 710 and 720 may be performed. In other instances, the optical transceiver will be added to the line card without replacing other equipment; in such instances, steps 710-720 may not be performed. In instances where a transmitter/receiver pair will be replaced, the cage utilized in that configuration may remain on the line card and used to receive the transceiver, as described below. In instances where a transceiver will be added to the line card without removing other equipment, a cage may be added to the line card or the line card may already be configured with an empty cage.

At step 710 the optical transmitter whose functionality will be replaced by the optical transceiver may be decoupled from the optoelectrical connector. The signals received and transmitted by the optical transmitter/receiver pair which is to be replaced may be routed to another such pair or routed to another optical transceiver on the line card such that these signals are not interrupted; as an example, the signals may be rerouted prior to decoupling the optical transmitter from the optoelectrical connector. To further illustrate this, an example situation may be considered in which the transmitter/module pair 320b-360a in the example embodiment illustrated in FIG. 3 will be replaced by a transceiver. The traffic currently handled by this pair may be rerouted such that the pair may be replaced without interrupting the traffic the pair handled. Thus, the traffic may be rerouted to transceiver 670c of the example embodiment illustrated in FIG. 6. In another example situation, step 730 may be performed before step 710. In such an example situation, the signals handled by the transmitter being removed in step 710 may be rerouted to the transceiver coupled to the line card in step 730. It may be advantageous to have the signals uninterrupted while upgrading so as to minimize down time. In some instances, down time may be eliminated. Decoupling the optical transmitter may involve decoupling the optical fibers extending from the transmitter and the optoelectrical connector (such as optical fibers 322 and 332). Routing the signals may be accomplished using electrical paths, junctions, or switches, such as a crosspoint switch.

At step 720 the optical receiver whose functionality will be replaced by the optical transceiver is decoupled from the optoelectrical connector. This may involve removing the module comprising the receiver from the cage.

At step 730 the optical transceiver may be secured to the line card. This may include inserting the transceiver into the cage. In particular embodiments, step 730 may be performed after step 700, such as when optical transceiver is not replacing the functionality of an optical transmitter/receiver pair. At step 740, the optical transceiver may be coupled to the optoelectrical connector. This may occur by inserting the transceiver into the cage, as in step 730. Pins, etched paths, PCBs, and/or leads may be used to couple the transceiver to the connector. In certain embodiments, such as when the optical transceiver is not replacing the functionality of an optical transmitter/receiver pair, the optical transceiver may be coupled to an electrical connector (such as electrical connector 350) rather than an optoelectrical connector. Further, electrical signal traffic may be routed to the newly-installed optical transceiver by utilizing an electrical junction coupled to the connector (either optoelectrical or electronic) to which the optical transceiver is coupled. The cage and transceiver may be configured in a pluggable form factor such as Small Form Factor Pluggable (SFP), 10 Gigabit Small Form Factor Pluggable (XFP), or any other specification which specifies the design of pluggable devices. Hence, the example process depicted in FIG. 7 may illustrate how to upgrade an existing system to utilize tunable XFP transceivers. Thus, the system may be considered tunable-XFP-transceiver-ready.

Although several embodiments have been illustrated and described in detail, it will be recognized that modifications and substitutions are possible without departing from the spirit and scope of the appended claims.

What is claimed is:

1. A method for upgrading an optoelectrical system, comprising:
   securing a transmitter to a line card, wherein the line card comprises an optoelectrical connector;
   coupling the transmitter to the connector, wherein the connector comprises an embedded fiber configured to be coupled to the transmitter;
   inserting a pluggable form factor module comprising a receiver, an input port, and an output port into a cage secured to the line card; and
   coupling the pluggable form factor module to the connector such that an optical signal transmitted by the transmitter propagates in an optical line of sight between the embedded fiber of the connector and the output port, wherein the connector comprises electrical contacts that are configured to be coupled to the pluggable form factor module such that the receiver can convert optical signals received at the input port into electrical signals and transmit the electrical signals to the line card via the connector.

2. The method of claim 1, wherein the transmitter comprises an Integratable Tunable Transmitter Assembly (ITTA).

3. The method of claim 1, wherein the receiver comprises a Receiver Optical Sub-Assembly (ROSA).

4. The method of claim 1, wherein the connector comprises a lens coupled to an end of the embedded fiber.

5. The method of claim 1, wherein the electrical contacts comprise pins.

6. The method of claim 1, further comprising aligning the connector with the output port utilizing a sensor and an alignment tool.

7. The method of claim 6, wherein the sensor comprises a power meter.

8. The method of claim 6, wherein the alignment tool comprises a mechanized mirror.

9. The method of claim 6, wherein the alignment tool comprises a birefringent crystal.

10. The method of claim 6, wherein aligning the connector with the output port further comprises:
    measuring an amount of optical signals traveling out of the connector but not out of the output port utilizing the sensor; and
    adjusting the alignment tool in response to the measurement of the sensor.

11. A method for upgrading an optoelectrical system, comprising:
    providing an optoelectrical system, comprising:
        a transmitter configured to transmit optical signals;
        a pluggable form factor module comprising an input port, an output port, and a receiver configured to convert optical signals received at the input port into electrical signals;
        an optoelectrical connector coupled to the pluggable form factor module and the transmitter, the connector comprising an embedded fiber coupled to the transmitter and configured to transmit the optical signals from the transmitter to the output port of the module, and electrical contacts configured to receive the electrical signals from the receiver; and
        a cage configured to house the pluggable form factor module and the connector, wherein the transmitter is positioned outside the cage;
    decoupling the transmitter from the connector;
    decoupling the pluggable form factor module from the connector; and
    coupling a pluggable form factor transceiver to the connector, wherein the pluggable form factor transceiver comprises:
        an input port;
        an output port;
        a transmitter operable to receive electrical signals from the electrical contacts, convert the electrical signals into optical signals, and communicate the optical signals from the output port; and
        a receiver operable to receive optical signals through the input port, convert the optical signals into electrical signals, and communicate the electrical signals to the electrical contacts.

12. The method of claim 11, further comprising:
    routing signals away from the transmitter and the module to at least one component on the line card configured to send or receive optical signals before the transmitter and the module are decoupled from the connector; and
    routing signals to the transceiver from the at least one component on the line card after the transceiver is coupled to the connector.

13. The method of claim 12, wherein the routing steps utilize a crosspoint switch.

14. The method of claim 11, wherein the electrical contacts comprise pins.

15. The method of claim 11, wherein the receiver comprises a Receiver Optical Sub-Assembly (ROSA).

16. The method of claim 11, wherein the transmitter comprises an Integratable Tunable Transmitter Assembly (ITTA).

17. The method of claim 11, wherein the optoelectrical system further comprises a line card on which the transmitter, the module, the connector, and the care are secured.

18. The method of claim 17, further comprising decoupling the transmitter from the line card.

19. The method of claim 11, wherein the pluggable form factor module comprises a 10 Gigabit Small Form Factor Pluggable (XFP) module.

20. The method of claim 11, wherein the pluggable form factor transceiver comprises a 10 Gigabit Small Form Factor Pluggable (XFP) transceiver.

* * * * *